United States Patent [19]

Matsumoto et al.

[11] Patent Number: 5,679,897
[45] Date of Patent: Oct. 21, 1997

[54] PIEZOELECTRIC TYPE ACCELERATION SENSOR WITH METALLIC CASE AND RESIN PACKAGE

[75] Inventors: Hideki Matsumoto, Tokyo; Harumi Aoki, Sagamihara; Shinji Shimazaki, Nishinomiya; Katsuyuki Tsuji, Osaka; Toshiharu Saitoh, Yokohama, all of Japan

[73] Assignee: Matsushita Electric Industrial Co., Ltd., Osaka, Japan

[21] Appl. No.: 568,511

[22] Filed: Dec. 7, 1995

[30] Foreign Application Priority Data

Jul. 25, 1995 [JP] Japan ................. 7-188896
Sep. 7, 1995 [JP] Japan ................. 7-229819

[51] Int. Cl.$^6$ ................. G01P 15/09; H01L 41/08
[52] U.S. Cl. ................. 73/514.34; 310/324
[58] Field of Search ................. 73/514.34; 310/324

[56] References Cited

U.S. PATENT DOCUMENTS

| | | | |
|---|---|---|---|
| 4,354,134 | 10/1982 | Micheron | 73/514.34 |
| 5,003,824 | 4/1991 | Fukada et al. | 73/514.34 |

FOREIGN PATENT DOCUMENTS

| | | | |
|---|---|---|---|
| 000351038 | 1/1990 | European Pat. Off. | 73/514.34 |
| 000401669 | 12/1990 | European Pat. Off. | 73/514.34 |
| 402074868 | 3/1990 | Japan | 73/514.34 |
| 403006461 | 1/1991 | Japan | 73/514.34 |
| 404027872 | 1/1992 | Japan | 73/514.34 |

Primary Examiner—Hezron E. Williams
Assistant Examiner—Richard A. Moller
Attorney, Agent, or Firm—Pollock, Vande Sande & Priddy

[57] ABSTRACT

A disc-shaped diaphragm 16 is fixed on a protruding portion 15a formed on the bottom of case 15. Piezoelectric elements 17 and 18 are bonded on upper and lower surfaces of the diaphragm 16. A printed circuit board 24 closes the opening of case 15. Outer surfaces of case 15 and printed circuit board 24 are covered by a resin package 28. Lead terminals 22 and 23 are held by a lead holding member 21. Lead terminals 22 and 23 connect the piezoelectric elements 17 and 18 with a circuit on printed circuit board 24. With this arrangement, it becomes possible to provide an acceleration sensor used in an air bag system which is capable of reducing the number of parts and simplifying the structure.

22 Claims, 6 Drawing Sheets

PIEZOELECTRIC TYPE ACCELERATION SENSOR WITH METALLIC CASE AND RESIN PACKAGE

BACKGROUND OF THE INVENTION

1. Field of the Invention:

The present invention relates to an acceleration sensor housed in a case and incorporated, for example, in an air bag system equipped in an automotive vehicle.

2. Prior Art:

FIG. 6 shows a conventional acceleration sensor. In FIG. 6, reference numeral 1 represents a metallic case having an opening at the upper end thereof. This metallic case 1 has a bottom with some holes through which lead pins 2a, 2b, 2c and 2d are fixed. Of these lead pins 2a through 2d, only one lead pin 2b is directly fixed to the hole of the case 1. Other lead pins 2a, 2c and 2d are sealed by glass hermetic seal 3. Reference numeral 4 represents a resin base which has an upper recess engaged with a metallic support member 5 with a ring protrusion 5a. The base 4 is bonded onto the bottom surface of the case 1 by adhesive material.

Reference numeral 6 represents a diaphragm having a central portion welded to the ring protrusion 5a of the support member 5. This diaphragm 6 has upper and lower surfaces on which piezoelectric elements 7 and 8 are attached, respectively. Electrodes (not shown) are formed on an upper surface of the piezoelectric element 7 and a lower surface of the piezoelectric element 8. Reference numeral 9 represents a printed circuit board with small holes into which distal ends of lead pins 2a through 2d are inserted. The lead pins 2a through 2d are soldered after they are inserted into small holes on the printed circuit board 9.

Reference numeral 10 represents a plurality of lead terminals provided on the resin base 4. These lead terminals 10 electrically connect the electrodes of piezoelectric elements 7 and 8 to a circuit on the printed circuit board 9. An electronic component, such as an integrated circuit, is mounted on the printed circuit board 9, so as to constitute various circuits including an impedance conversion circuit, a filter circuit and an amplification circuit.

Reference numeral 12 represents a metallic lid which is welded along the periphery of the opening of case 1. Reference numeral is represents an installation hole for installing the acceleration sensor onto an object whose acceleration is to be detected.

According to the above-described conventional acceleration sensor, vibration caused from the object is transmitted to the acceleration sensor and vibrates the diaphragm 6 therein. In response to the vibration of diaphragm 8, piezoelectric elements 7 and 8 bonded on the diaphragm 8 are alternately subjected to tensile and compressive forces. Thus, the piezoelectric elements 7 and 8 generate electric charges which are then transmitted to the printed circuit board 9 through lead terminal 10, converted by the impedance conversion circuit into a voltage signal, and processed by the succeeding filter circuit and amplification circuit into a signal having adequate band and level which is then outputted through the lead pin 2.

Meanwhile, when an actuation signal is applied from an external device via lead pin 2, this actuation signal is supplied to respective piezoelectric elements 7 and 8 to vibrate diaphragm 6 together with piezoelectric elements 7 and 8. Charges generated by vibration caused by piezoelectric elements 7, 8 and diaphragm 6 in response to the actuation signal are converted by the impedance conversion circuit on the printed circuit board 9 into a voltage signal, and subsequently processed by the succeeding filter circuit and amplification circuit into a signal having predetermined band and level which is then outputted through the lead pin 2. Detecting this output signal by an external device makes it possible to diagnose the piezoelectric elements 7 and 8 and check the presence of failure, open circuit or the like, thereby realizing the self-check function.

However, the above-described prior art requires many parts and has a complicated structure because the support member 5 supporting the diaphragm 8 needs to be inserted into the recess of the resin base 4 in order to electrically insulate the support member 5 from the case 1 and also because the metallic lid 12 is used to seal the case 1. Furthermore, fixedly welding the lid 12 along the periphery of the opening of case 1 would require a large-scale welding machine.

SUMMARY OF THE INVENTION

Accordingly, in view of above-described problems encountered in the prior art, a principal object of the present invention is to provide an acceleration sensor which is small in the number of parts, simple in structure, and does not require a large-scale welding machine.

In order to accomplish the above-described and other related objects, a first aspect of the present invention provides an acceleration sensor comprising: a metallic case having an opening at one end thereof; a protrusion formed on a bottom of the case; a diaphragm having a central portion fixed to the protrusion; a pizoelectric element attached on a surface of this diaphragm; a printed circuit board closing the opening of the metallic case; connecting means for connecting an electrode of the piezoelectric element to a circuit of the printed circuit board; a terminal connecting the circuit of the printed circuit board to an external device; and a resin package covering outer surfaces of the metallic case and the printed circuit board.

According to a first aspect of the acceleration sensor of the present invention, the diaphragm is fixed on the protrusion formed on the bottom of the metallic case. Furthermore, the printed circuit board is used to close the opening of the case so as to define a closed space in the case. Hence, the structure is simplified and it becomes possible to reduce the size.

In a preferable mode, the connecting means comprises an insulating lead holding member accommodated in the case and a lead terminal held by the lead holding member, so that one end of the lead terminal is connected to an electrode of the piezoelectric element and the other end of the lead terminal is connected to the printed circuit board.

According to this arrangement, one end of the lead terminal held by the lead holding member is connected to the electrode of the piezoelectric element. More specifically, after one end of the lead terminal held by the lead holding member is connected to the piezoelectric element, the assembly of the diaphragm unit and the lead holding member is easily installed into the case. Hence, installation of the acceleration sensor is simplified.

Furthermore, it is desirable that the insulating lead holding member accommodated in the case is formed with a projection, so that this projection can be engaged with a hole formed on the printed circuit board when the opening of the case is closed by the printed circuit board.

According to this specific arrangement, the projection is formed on the lead holding member holding the lead terminal, the projection being engaged with the hole formed on the printed circuit board closing the opening of the case. Therefore, the lead holding member accommodated in the case is accurately placed in position by the printed circuit board covering the opening of the case.

Still further, the lead terminal held by the lead holding member has one end bifurcated into a pair of opposing terminal rims, one of the terminal rims is connected to an electrode of a piezoelectric element bonded on one surface of the diaphragm, and the other of the terminal rims is connected to an electrode of another piezoelectric element bonded on the other surface of the diaphragm.

According to this specific arrangement, opposing terminal rims are formed at one end of the lead terminal held by the lead holding member. Thus, these terminal rims can be easily connected to the electrodes of respective piezoelectric elements bonded on both surfaces of the diaphragm.

Of two electrodes formed on both surfaces of the piezoelectric element, one electrode to be bonded on the diaphragm is connected to a circuit on the printed circuit board via the diaphragm and the case.

According to this specific arrangement, one of the electrodes of the piezoelectric element bonded on the diaphragm is connected to the printed circuit board utilizing the diaphragm and the case. Accordingly, there is no necessity of using another lead terminal. Hence, structure and connecting work are simplified.

More specifically, two electrodes are formed on a piezoelectric element bonded on the surface of the diaphragm. One of these two electrodes serves as an actuating signal supplying electrode, while the other of these two electrodes serves as a vibration detecting electrode.

According to this specific arrangement, one of two electrodes formed on the piezoelectric element serves as a vibration detecting electrode, while the other serves as an actuating signal supplying electrode used for self-check of the acceleration sensor.

Moreover, it is preferable to additionally provide a support column having one end fixed to the printed circuit board and the other end brought into contact with the protrusion formed on the bottom of the case.

According to this specific arrangement, it becomes possible to prevent the printed circuit board from being deflected inward when it receives a pressing force from a resin package molding operation covering the outer surfaces of the case and the printed circuit board with resin.

Furthermore, a second aspect of the present invention provides an acceleration sensor comprising: a metallic case having an opening at an upper end thereof; a protrusion formed on a bottom of the metallic case, the protrusion being electrically conductive and integral with the metallic case; a diaphragm configured into a flat shape having upper and lower surfaces around a hole engaged with a boss formed on the protrusion; upper and lower piezoelectric elements attached on the upper and lower surfaces of the diaphragm, respectively; a printed circuit board having a shape fitting to the opening of the metallic case, so as to close the opening when the printed circuit board is engaged with the metallic case; connecting means for connecting an electrode of each piezoelectric element to a circuit on the printed circuit board; a terminal connecting the circuit of the printed circuit board to an external device; and a resin package covering outer surfaces of the metallic case and the printed circuit board.

According to the above-described second aspect acceleration sensor of the present invention, the diaphragm has upper and lower surfaces mountable piezoelectric elements around a hole engaged with the boss formed on the protrusion. Hence, the diaphragm is easily positioned and fixed on the protruding portion without causing interference with the piezoelectric elements. Thus, installation and fixation of the diaphragm mounting the piezoelectric elements thereon in the metallic case is easily performed.

Still further, a third aspect of the present invention provides an acceleration sensor comprising: a metallic case having an opening at an upper end thereof; a protrusion formed by a bottom of the metallic case; a diaphragm configured into a disc shape having upper and lower surfaces, with a central hole engaged with a boss formed on the protrusion; a shoulder formed by a vertical side wall of the metallic case along the opening; upper and lower piezoelectric elements attached on the upper and lower surfaces of the diaphragm, respectively; a printed circuit board mounted on the shoulder so as to close the opening of the metallic case; connecting means for connecting an electrode of each piezoelectric element to a circuit on the printed circuit board; a terminal connecting the circuit of the printed circuit board to an external device; and a resin package covering outer surfaces of the metallic case and the printed circuit board.

According to this third aspect acceleration sensor of the present invention, a shoulder is integrally formed by the vertical side wall of the metallic case as well as the protrusion formed by the bottom of the metallic case. Providing such a shoulder is effective to surely mount and accurately place the printed circuit board at a predetermined position.

In a preferable mode, the shoulder is configured into a stepped portion having a flat surface extending horizontally along the opening, so that the shoulder can support the printed circuit board at the flat surface. Furthermore, the shoulder is formed by bending the vertical side wall of the metallic case. Thus, the structure is simplified and the number of parts can be reduced. Yet further, an elongated piece is integrally formed on the vertical side wall in the vicinity of the opening of the metallic case. This elongated piece is folded to temporarily fix the printed circuit board when the printed circuit board is positioned on the shoulder.

Moreover, besides the acceleration sensor itself, the present invention provides a novel manufacturing method of assembling and producing an acceleration sensor. Thus, according to a fourth aspect of the present invention there is provided a method of manufacturing an acceleration sensor comprising steps of: holding a lead terminal by a lead holding member; attaching a piezoelectric element on a surface of a diaphragm; connecting one end of the lead terminal onto an electrode of the piezoelectric element, thereby forming an assembly comprising the diaphragm and the lead holding member; installing the assembly at a predetermined portion in a metallic case having an opening at an upper end thereof, and fixing the diaphragm onto a protruding portion formed on a bottom of the metallic case; mounting a printed circuit board on a shoulder formed on a vertical side wall of the metallic case along the opening, thereby closing the opening of the metallic case by the printed circuit board; and forming a resin package covering surfaces of the metallic case and the printed circuit board.

It is preferable that the lead holding member has a projection which is inserted into a hole of the printed circuit board when the printed circuit board is mounted on the shoulder. And, the elongated piece integrally formed on the vertical side wall is folded after the printed circuit board is mounted on the shoulder to fix the printed circuit board on the shoulder. Furthermore, the other end of the lead terminal is inserted into a hole formed on the printed circuit board and soldered with a land on the printed circuit board after the printed circuit board is mounted on the shoulder.

BRIEF DESCRIPTION OF THE DRAWINGS

The above and other objects, features and advantages of the present invention will become more apparent from the following detailed description which is to be read in conjunction with the accompanying drawings, in which:

FIG. 8 is a cross-sectional view showing an arrangement of a conventional acceleration sensor.

DETAILED DESCRIPTION OF THE PREFERRED EMBODIMENTS

Figure 1:
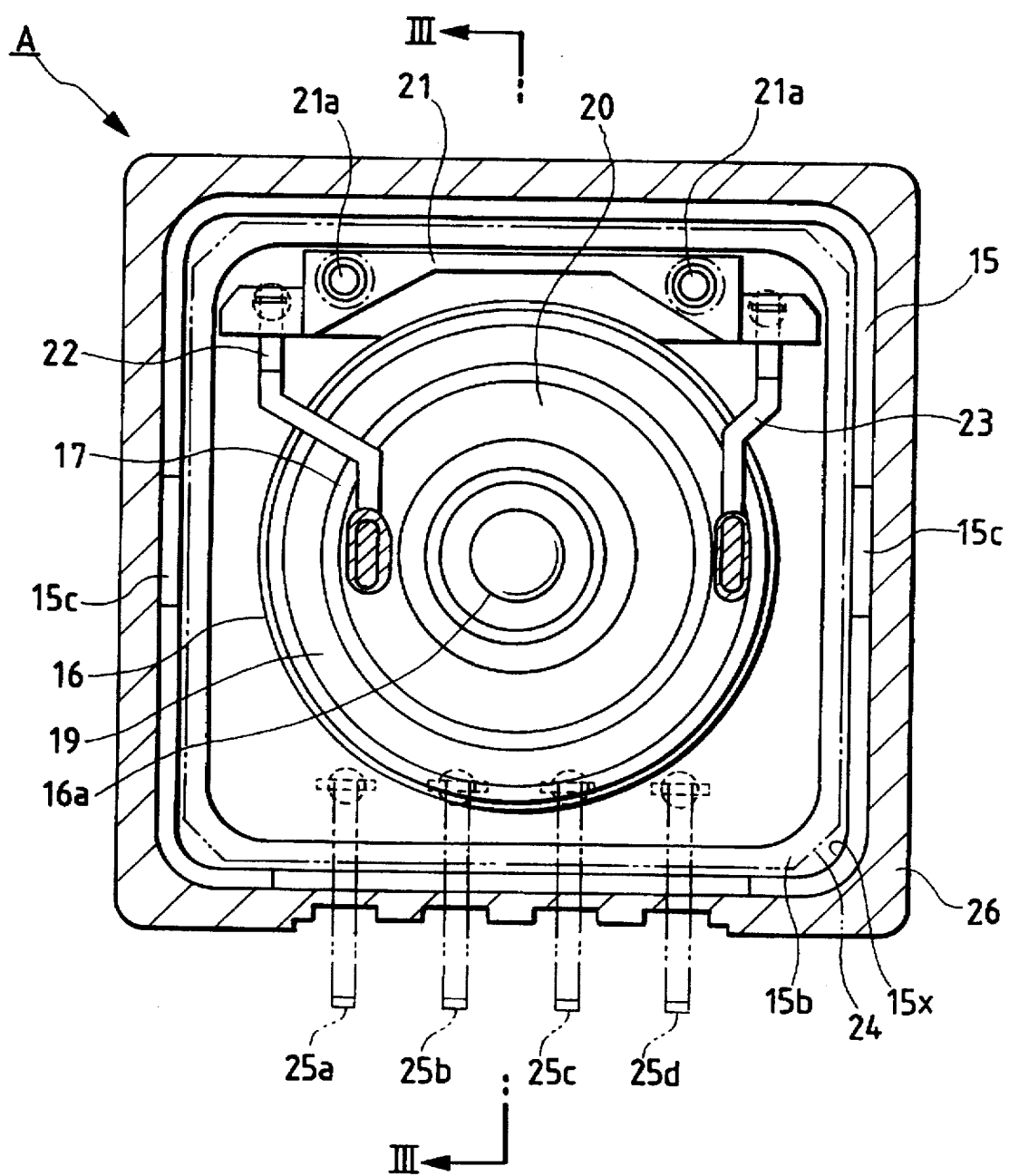
FIG. 1 is a plan view showing an arrangement of an acceleration sensor in accordance with the first embodiment of the present invention, taken along a line I—I of FIG. 2.

Preferred embodiments of the present invention will be explained in greater detail hereinafter, with reference to the accompanying drawings. Identical parts are denoted by identical reference numerals throughout the views.

An acceleration sensor "A" in accordance with a first embodiment of the present invention will be explained hereinafter with reference to FIGS. 1 through 4. In FIGS. 1 through 4, a metallic case 15 has an opening 15x at the upper end thereof. This metallic case 18 has a bottom 15y with a protruding portion 15a projecting inward (i.e. upward from the bottom 15y) at the center thereof. This protruding portion 15a has a positioning boss 15z at the top thereof. A shoulder portion 15b is formed on a vertical side wall of case 15 along an inner periphery of the case opening 15x.

More specifically, the shoulder portion 15b is configured into a stepped portion having a horizontal flat surface like a shelf extending horizontally along the opening 15x. The shoulder portion 15b is formed by bending the side wall of the case 15. Thus, the shoulder portion 15b can support a member mounted thereon. Furthermore, an elongated piece 15c is integrally formed on the vertical side wall of case 15 in the vicinity of the opening 15x.

In an inside space of the case 15, there is disposed a diaphragm 16 configured into a disc shape. This diaphragm 16 has a hole 16a at the center thereof. The central hole 16a of this diaphragm 16 is coupled with the positioning boss 15z formed on the top of the protruding portion 15a of the case 15; thus, the diaphragm 16 is positioned in a predetermined position in the case 15.

Figure 2:
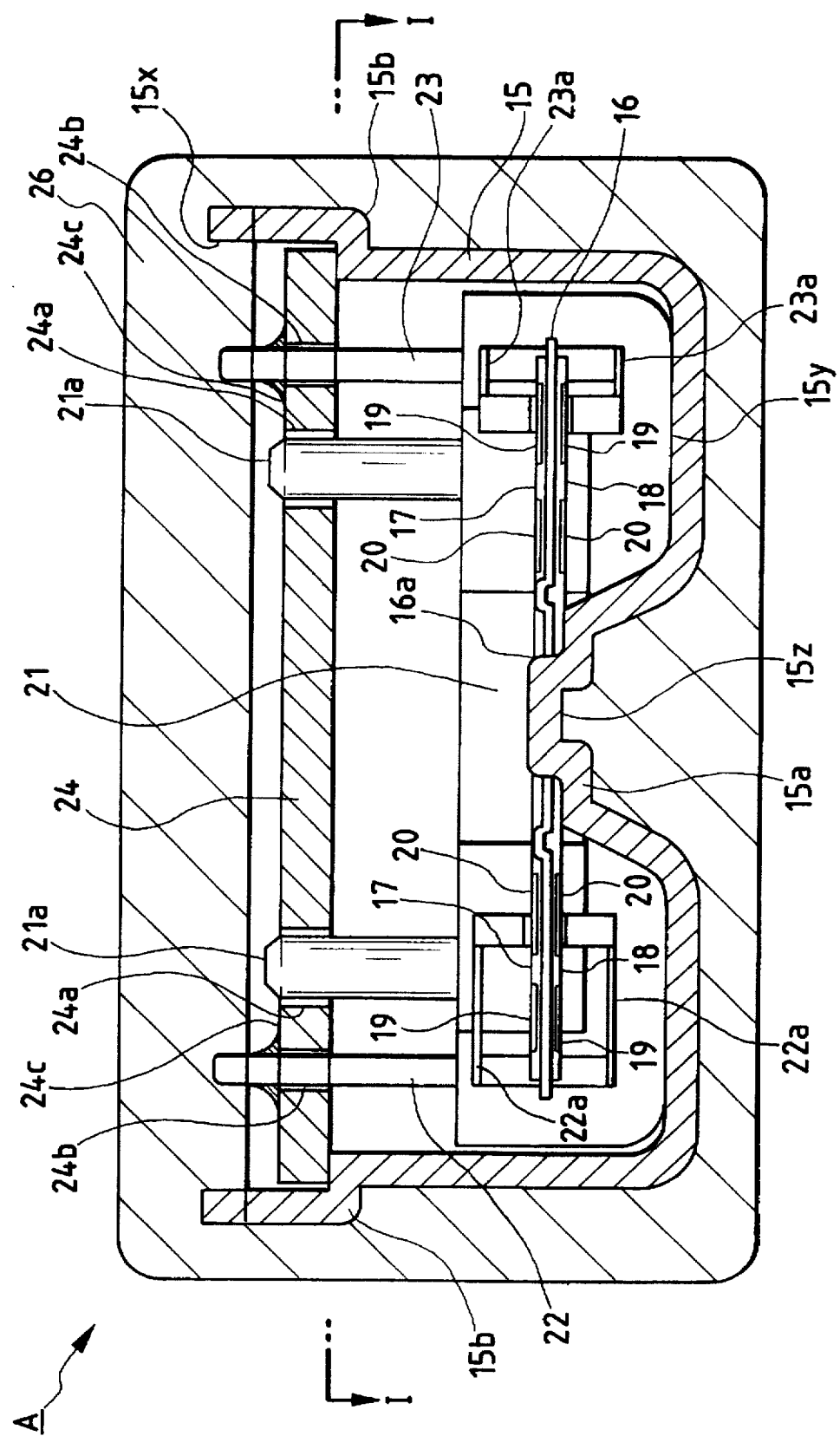
FIG. 2 is a front cross-sectional view showing the arrangement of the acceleration sensor in accordance with the first embodiment of the present invention, taken along a line II—II of FIG. 3.
Figure 3:
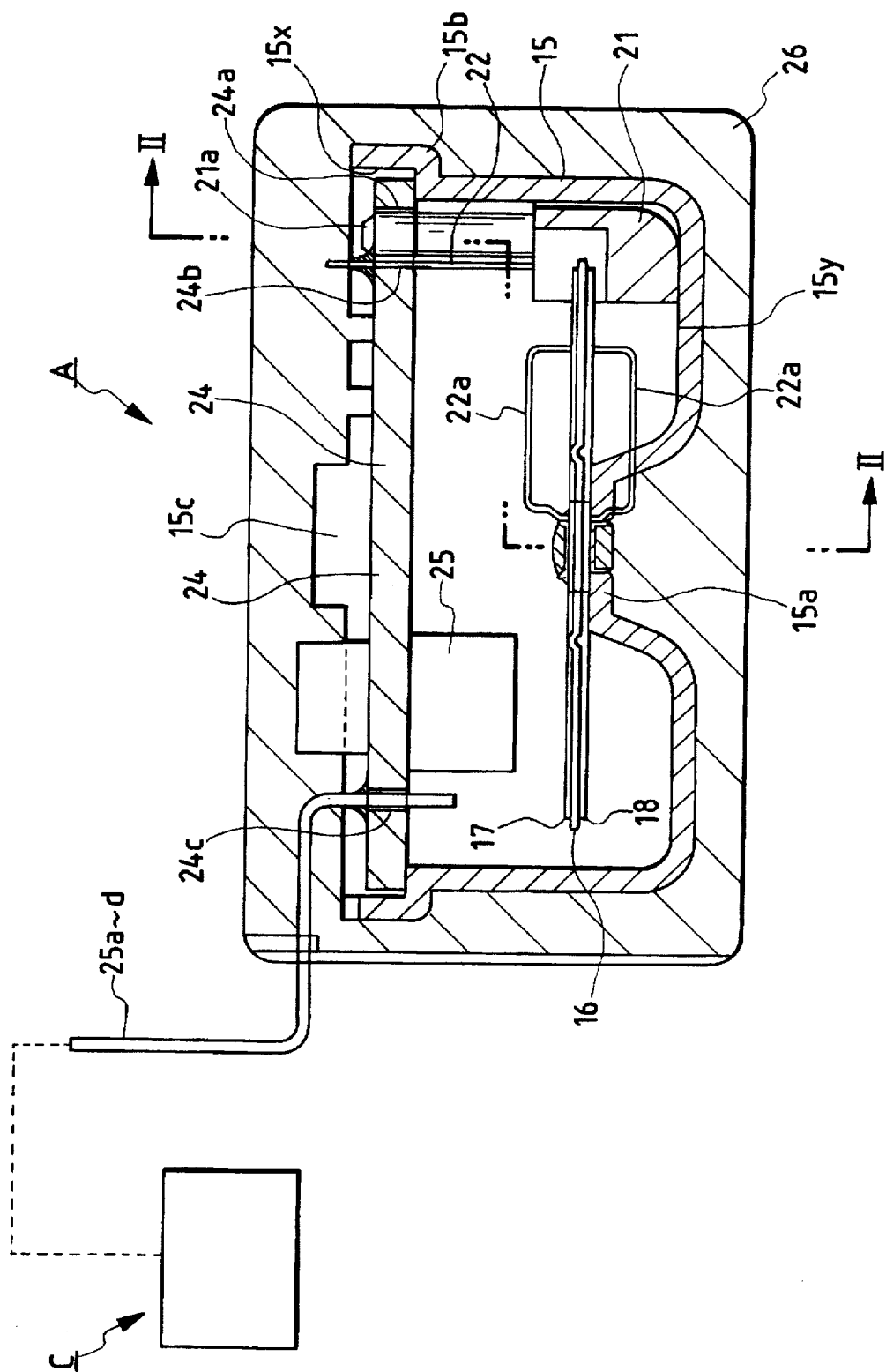
FIG. 3 is a side cross-sectional view showing the arrangement of the acceleration sensor in accordance with the first embodiment of the present invention, taken along a line III—III of FIG. 1.
Figure 4:
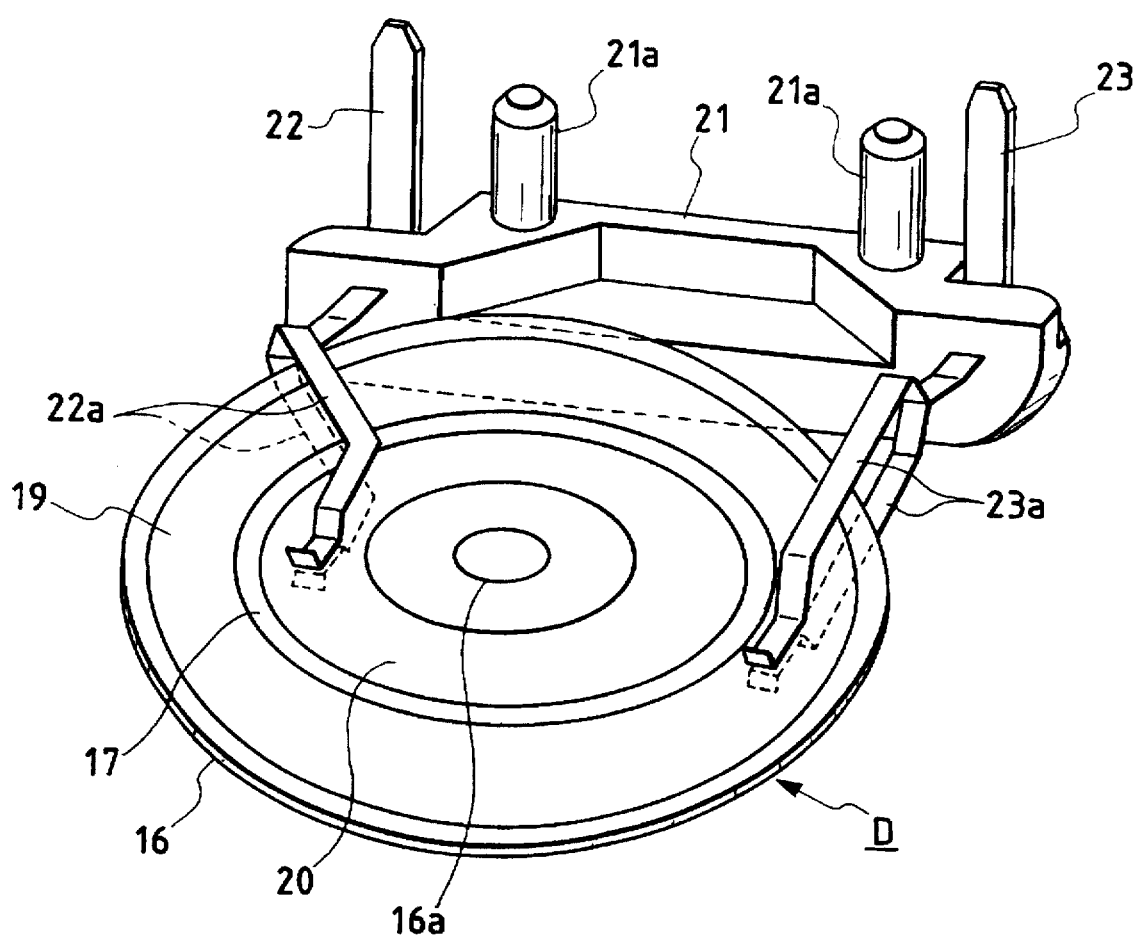
FIG. 4 is a perspective view showing an essential part of the acceleration sensor in accordance with the first embodiment of the present invention.

The diaphragm 16 is welded fixedly at the center thereof to the protruding portion 15a so as to cause vibration in response to an external force given. The diaphragm 16 has both upper and lower surfaces on which piezoelectric elements 17 and 18 are bonded, respectively. On a front surface of each of piezoelectric elements 17 and 18, there are formed two, outer and inner, ring electrodes 19 and 20 coaxially arrayed as shown in FIGS. 1, 2 and 4. The other surface of each of piezoelectric elements 17 and 18 (i.e. the reverse surface bonded onto the surface of diaphragm 16) is formed with an electrode which is electrically connected to the diaphragm 16 which is further electrically connected to the metallic case 15 at the positioning boss 15Z.

At one side of the inside space of case 15, there is disposed a lead holding member 21 which is made of insulating resin. This lead holding member 21 holds the central portions of lead terminals 22 and 23. One end of each of lead 25 terminals 22 and 23 is bifurcated into mutually opposing terminal rims 22a, 22a or 23a, 23a. The other end of each of lead terminals 22 and 23 is bent and extends upward. The lead terminals 22 and 23 are made from an electrically conductive plate.

The mutually opposing terminal rims 22a, 22a or 23a, 23a can be formed by separating each lead terminal 22 or 23 into a pair of laminated upper and lower pieces, or by cutting each lead terminal 22 or 23 into thin (i.e. half-width) right and left pieces. The distal ends of terminal rim 22a, 22a are soldered onto inner ring electrodes 20, 20 of respective piezoelectric elements 17 and 18. On the other hand, the distal ends of terminal rim 23a, 23a are soldered onto outer ring electrodes 19, 19 of respective piezoelectric elements 17 and 18.

A pair of, right and left, projections 21a, 21a are integrally formed on the upper surface of the lead holding member 21. As shown in FIG. 4, a diaphragm unit "D", having a pair of piezoelectric elements 17 and 18 boned on both surfaces thereof, is welded to the terminal rims 22a and 23a of lead terminals 22 and 23, and is then installed together with the lead holding member 21 into the case 15 so as to place them at a predetermined position in the case 15. Thereafter, the central portion of the diaphragm unit "D" is fixedly welded onto the protruding portion 15a (at the positioning boss 15z) of the bottom 15y of case 15.

The shoulder portion 15b mounts or supports a printed circuit board 24 on which an electronic component 25, such as an integrated circuit, is provided. On this printed circuit board 24, there are provided numerous circuits, such as an impedance conversion circuit, a filter circuit, and an amplification circuit. The printed circuit board 24 has a rectangular shape just fitting to the opening 15x of the case 15 having the same rectangular shape so that the printed circuit board 24 is surely placed on the shoulder portion 15b when it is engaged with the opening 15x of case 15 as shown by an alternate long and two short dashes line in FIG. 1.

When the printed circuit board 24 is certainly placed on the shoulder portion 15b of case 15, the projections 21a and 24a formed on the lead holding member 21 can engage with holes 24a, 24a formed on the printed circuit board 24 while the upper ends of lead terminals 22 and 23 extending upward from the lead holding member 21 are just inserted into holes 24b, 24b of printed circuit board 24 and soldered with lands 24c, 24c on the printed circuit board 24.

As the printed circuit board 24 is directly mounted on the shoulder portion 15b which is made of conductive material (i.e. metallic case 15), the electrode formed on the reverse surface of each piezoelectric element 17 or 18 is electrically connected to the printed circuit board 24 without using a special or additional lead, i.e. via the metallic case 15. In other words, the metallic case 15 is utilized as an electrical conductive path connecting the diaphragm 16 and the printed circuit board 24.

Terminals 25a, through 25d have inner terminal ends inserted into small holes on the printed circuit board 24 and welded there, and outer terminal ends connected to an external device "C". Thus, signals generated from the circuits on the printed circuit board 24 can be taken out of the acceleration sensor "A" via these terminals 25a and 25d.

After the printed circuit board 24 is placed on the shoulder portion 15b of case 15, the elongated piece 15c is folded inward so as to temporarily fix the printed circuit board 24 on the shoulder portion 15b of the case 15.

The assembly thus installed by closing the opening 15x of case 15 with the printed circuit board 24 is then conveyed into an insert molding machine (not shown), wherein the outer surface of the assembly (i.e. both the case 15 and the printed circuit board 24) is entirely covered by insulating resin to form a resin package 26.

When the above-described acceleration sensor "A" is subjected to vibration, the diaphragm 16 itself causes vibration which alternately applies tensile and compressive forces on the piezoelectric elements 17 and 18 bonded on the diaphragm 16. Accordingly, piezoelectric elements 17 and 18 generate electric charges. These electric charges are sent from electrodes 19 to the impedance conversion circuit provided on the printed circuit board 24 via lead terminal 23 and converted therethrough into voltage signals, which are subsequently processed by the succeeding filter circuit and amplification circuit into adequate signals having the required frequency band and level, thereafter outputted to an external device "C" via two terminals 25a and 25b.

Furthermore, when activation signals are entered through other terminals 25c and 25d, these actuation signals are applied to electrodes 20 of piezoelectric elements 17 and 18 via lead terminal 22 to vibrate the diaphragm unit "D". Electric charges generated by this vibration are supplied from electrodes 19 to the circuit on the printed circuit board 24 via lead terminal 23, and then outputted through terminals 25a and 25b to detect the same, thereby allowing self check of the acceleration sensor "A".

Figure 5:
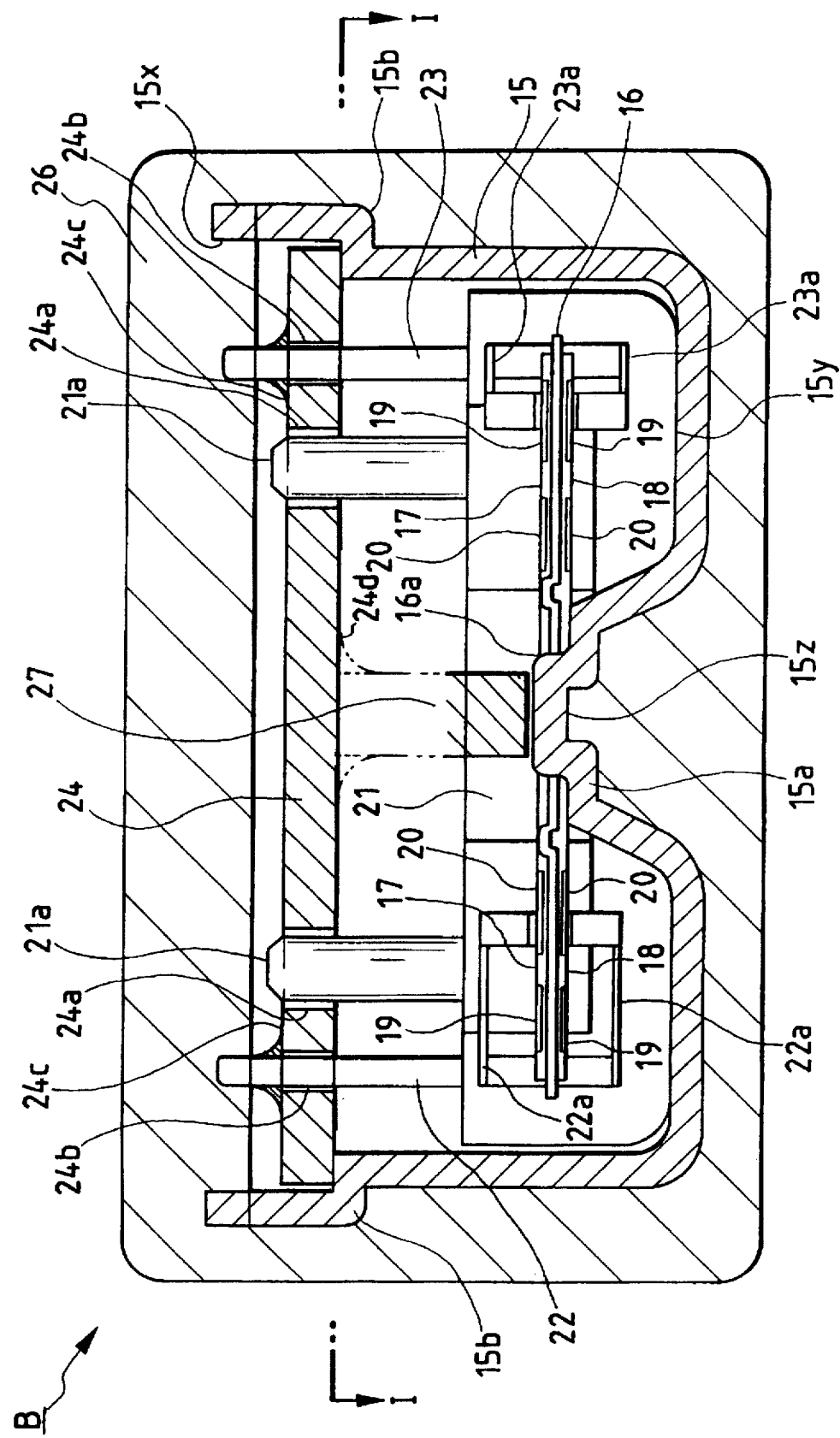
FIG. 5 is a front cross-sectional view showing an arrangement of an acceleration sensor in accordance with the second embodiment of the present invention, similar to FIG. 2.
Figure 6:
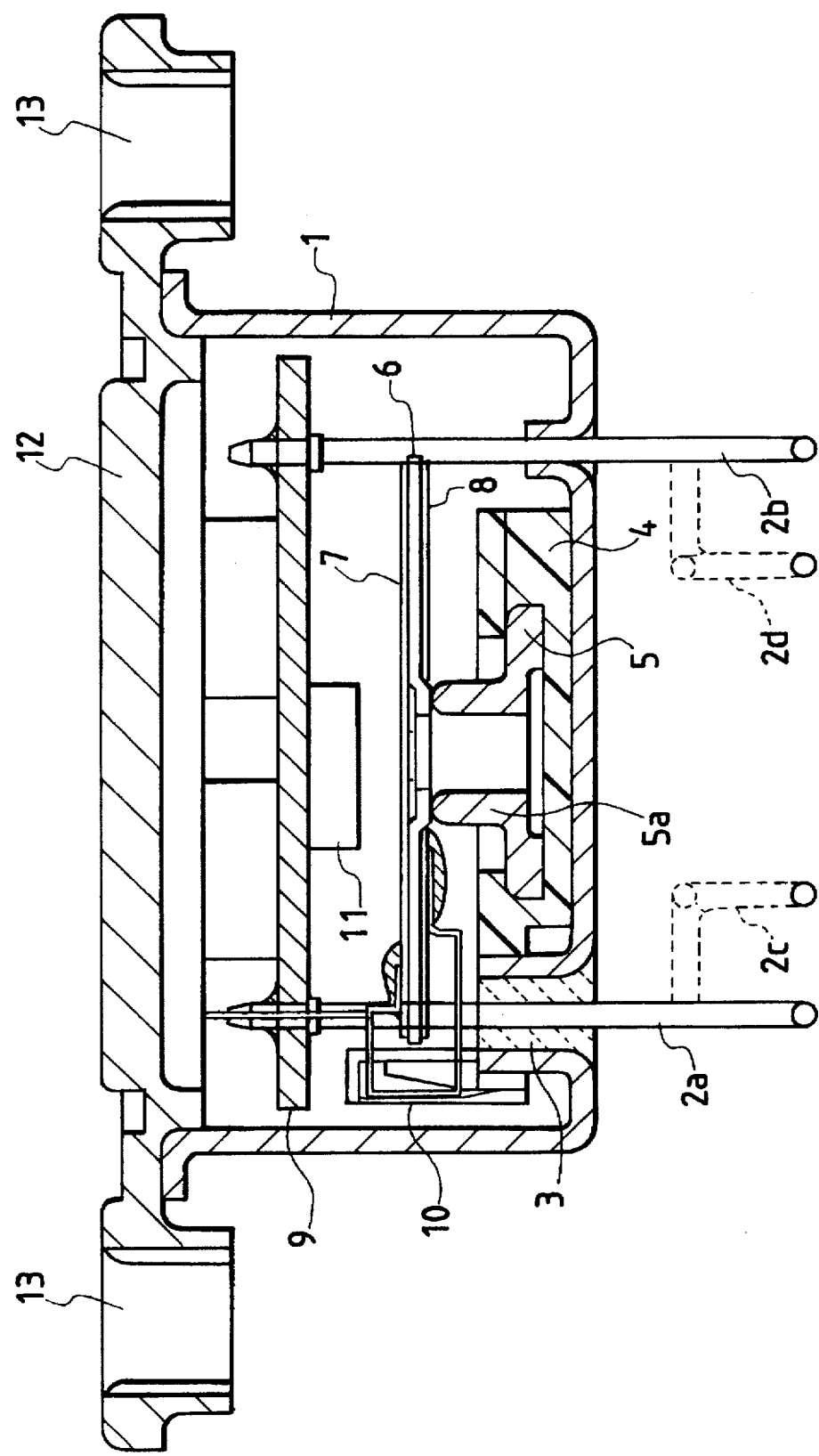

Next, a second embodiment of the present invention will be explained. FIG. 5 is a front cross-sectional view showing an acceleration sensor "B" in accordance with the second embodiment. Parts identical to those disclosed in the first embodiment are denoted by the same reference numerals in this drawing, and will not be explained again.

In FIG. 5, there is provided a metallic polygonal support column 27 extending downward from the printed circuit board 24. An upper end of the support column 27 is soldered onto a land 24d of printed circuit board 24, so that the support column 27 is securely fixed to the printed circuit board 24. The length of this support column 27 is determined so as to satisfy the requirement that the lower end of the support column 27 is just brought into contact with the positioning boss 15z on the top of protruding portion 15a raised upward from the case 15.

As well as the above-described first embodiment, the printed circuit board 24 is temporarily positioned on the shoulder portion 15b formed at the periphery of the opening 15x of case 15, and subsequently thus assembled unit is conveyed into the insert molding machine (not shown) wherein the outer surface of the assembly (i.e. both the case 15 and the printed circuit board 24) is entirely covered by insulating resin to form the resin package 26.

Provision of the support column 27 makes it possible to surely prevent the printed circuit board 24 from being deflected inward when it receives a force acting from the insert molding machine in the molding operation for forming the resin package 26 to be molded on the outer surface of the case 15 and printed circuit board 24.

If the printed circuit board 24 is deflected inward, there will be the possibility that some cracks may occur on the soldered portion or the electronic components mounted on the printed circuit board 24 may be damaged. Accordingly, to solve the problem of deflection of printed circuit board 24, the second embodiment provides the support column 27 soldered onto the land 24d of printed circuit board 24 in such a manner that the remote (i.e. lower) end of the support column 27 is just brought into contact with the positioning boss 15z formed on the protruding portion 15a protruding from the case 15 when the printed circuit board 24 is temporarily fixed to the shouldered portion 15b formed along the opening 15x of case 15.

According to the second embodiment, when the acceleration sensor "B" is subjected to vibration, the diaphragm 16 itself causes vibration. In the same manner as in the first embodiment, electric charger caused by vibration are supplied to the circuit on the printed circuit board 24 via lead terminal 23, and then outputted through terminals 25a and 25b to detect the same, thereby allowing self-check of the acceleration sensor "B".

Material of the support column 27 is not limited to solderable metals only; therefore, the support column 27 can be any other member fixable beforehand onto the printed circuit board 24 by means of other fixing means. Moreover, the configuration of the support column 27 is not limited to the polygonal one; thus, usage of a circular support column will be allowed in the present invention. Still further, it will be also possible to provide a tiny gap between the lower end of the support column 27 and the positioning boss 15z, so that the support column 27 can be brought into contact with the positioning boss 15z only when a significant deflection force is applied to the printed circuit board 24.

As is apparent from the foregoing description, the present invention utilizes a protruding portion formed on the bottom of the case as a means for fixing the diaphragm, and also utilizes the printed circuit board as a means for closing the opening of the case. Thus, the present invention has the merits of reducing the number of parts and providing a simplified structure. Furthermore, the present invention provides a resin seal arrangement covering both the outer surface of the case and the outer surface of the printed circuit board closing the opening of the case; therefore, there is no necessity of sealing the opening of the case by the welding using a large-scale welding machine which was mandatory in the conventional acceleration sensor. In other words, the present invention makes it possible to realize a sealing of the sensor case without performing a troublesome welding operation using a large-scale welding machine.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An acceleration sensor comprising:
   a metallic case having an opening at one end thereof;
   a protrusion integrally formed with said metallic case by the same member as said metallic case, so as to protrude from a bottom of said metallic case;

a diaphragm having a central portion fixed to said protrusion;

a piezoelectric element attached on a surface of said diaphragm;

a printed circuit board serving as a cover closing said opening of said metallic case;

connecting means for connecting an electrode of said piezoelectric element to a circuit of said printed circuit board;

a terminal connecting the circuit of said printed circuit board to an external device; and a resin package covering outer surfaces of said metallic case and said printed circuit board.

2. The acceleration sensor defined by claim 1, wherein said connecting means comprises an insulating lead holding member accommodated in said metallic case and a lead terminal held by said lead holding member, one end of said lead terminal is connected to an electrode of said piezoelectric element, and the other end of said lead terminal is connected to said printed circuit board.

3. The acceleration sensor defined by claim 2, wherein said insulating lead holding member accommodated in said metallic case is formed with a projection, and said projection is engaged with a hole formed on said printed circuit board when the opening of said metallic case is closed by said printed circuit board.

4. The acceleration sensor defined by claim 2, wherein said lead terminal held by said lead holding member has one end bifurcated into a pair of opposing terminal rims, one of said terminal rims is connected to an electrode of a piezoelectric element bonded on one surface of said diaphragm, and the other of said terminal rims is connected to an electrode of another piezoelectric element bonded on the other surface of said diaphragm.

5. The acceleration sensor defined by claim 1, wherein, electrodes are formed on opposite surfaces of said piezoelectric element, one electrode being bonded on said diaphragm and is connected to a circuit on said printed circuit board via said diaphragm and said metallic case.

6. The acceleration sensor defined by claim 1, wherein two electrodes are formed on a same surface of said piezoelectric element attached on the surface of said diaphragm, one of said two electrode serves as an actuating signal supplying electrode, and the other of said two electrodes serves as a vibration detecting electrode.

7. The acceleration sensor defined by claim 1, further comprising a support column having one end fixed to said printed circuit board and the other end brought into contact with said protrusion formed on the bottom of said metallic case when an external force is applied.

8. An acceleration sensor comprising:

a metallic case having an opening at an upper end thereof;

a protrusion formed by the same member as said metallic case and protruding from a bottom of said metallic case, so as to be electrically conductive and integral with said metallic case;

a diaphragm configured into a flat shape having upper and lower surfaces around a hole engaged with a boss formed on said protrusion;

upper and lower piezoelectric elements attached on said upper and lower surfaces of said diaphragm, respectively;

a printed circuit board having a shape fitting to said opening of said metallic case, so as to serve as a cover closing said opening when said printed circuit board is engaged with said metallic case;

connecting means for connecting an electrode of each piezoelectric element to a circuit on said printed circuit board;

a terminal connecting the circuit of said printed circuit board to an external device; and a resin package covering outer surfaces of metallic case and said printed circuit board.

9. The acceleration sensor defined by claim 8, wherein said connecting means comprises an insulating lead holding member accommodated in said metallic case and a lead terminal held by said lead holding member, one end of said lead terminal is connected to an electrode of said piezoelectric element, and the other end of said lead terminal is connected to said printed circuit board.

10. The acceleration sensor defined by claim 9, wherein said insulating lead holding member accommodated in said metallic case is formed with a projection, and said projection is engaged with a hole formed on said printed circuit board when the opening of said metallic case is closed by said printed circuit board.

11. The acceleration sensor defined by claim 9, wherein said lead terminal held by said lead holding member has one end bifurcated into a pair of opposing terminal rims, one of said terminal rims is connected to the electrode of said upper piezoelectric element attached on the upper surface of said diaphragm, and the other of said terminal rims is connected to the electrode or said lower piezoelectric element attached on the lower surface of said diaphragm.

12. The acceleration sensor defined by claim 8, wherein, electrodes are formed on opposite surfaces of said piezoelectric element, one electrode being bonded on said diaphragm and is connected to a circuit on said printed circuit board via said diaphragm and said metallic case.

13. The acceleration sensor defined by claim 8, wherein two electrodes are formed on a same surface of each piezoelectric element attached on the surface of said diaphragm, one of said two electrode serves as an actuating signal supplying electrode, and the other of said two electrodes serves as a vibration detecting electrode.

14. The acceleration sensor defined by claim 8, further comprises a support column having one end fixed to said printed circuit board and the other end brought into contact with said protrusion formed on the bottom of said metallic case when an external force is applied.

15. An acceleration sensor comprising:

a metallic case having an opening at an upper end thereof;

a protrusion formed by the same member as said metallic case and protruding from a bottom of said metallic case;

a diaphragm configured into a disc shape having upper and lower surfaces, with a central hole engaged with a boss formed on said protrusion;

a shoulder formed by a vertical side wall of said metallic case along said opening;

upper and lower piezoelectric elements attached on said upper and lower surfaces of said diaphragm, respectively;

a printed circuit board mounted on said shoulder so as to serve as a cover to closing said opening of said metallic case;

connecting means for connecting an electrode of each piezoelectric element to a circuit on said printed circuit board;

a terminal connecting the circuit of said printed circuit board to an external device; and a resin package covering outer surfaces of said metallic case and said printed circuit board.

16. The acceleration sensor defined by claim 15, wherein said shoulder is configured into a stepped portion having a flat surface extending horizontally along said opening, so that said shoulder can support said printed circuit board at the flat surface.

17. The acceleration sensor defined by claim 16, wherein said shoulder is formed by bending said vertical side wall of said metallic case.

18. The acceleration sensor defined by claim 15, wherein an elongated piece is integrally formed on said vertical side wall in the vicinity of said opening of said metallic case, and said elongated piece is folded to fix said printed circuit board on said shoulder.

19. A method of manufacturing an acceleration sensor comprising steps of:

holding a lead terminal by a lead holding member;

attaching a piezoelectric element on a surface of a diaphragm;

connecting one end of said lead terminal onto an electrode of said piezoelectric element, thereby forming an assembly comprising said diaphragm and said lead holding member;

installing said assembly at a predetermined portion in a metallic case having an opening at an upper end thereof, and fixing said diaphragm onto a protruding portion formed on a bottom of said metallic case;

mounting a printed circuit board on a shoulder formed on a vertical side wall of said metallic case along said opening, thereby closing the opening of said metallic case by said printed circuit board; and forming a resin package covering surfaces of said metallic case and said printed circuit board.

20. The manufacturing method of an acceleration sensor defined by claim 19, wherein said lead holding member has a projection which is inserted into a hole of said printed circuit board when said printed circuit board is mounted on said shoulder.

21. The manufacturing method of an acceleration sensor defined by claim 19, wherein an elongated piece is integrally formed on said vertical side wall in the vicinity of said opening, and said elongated piece is folded after said printed circuit board is mounted on said shoulder to fix said printed circuit board on said shoulder.

22. The manufacturing method of an acceleration sensor defined by claim 19, wherein the other end of said lead terminal is inserted into a hole formed on said printed circuit board and soldered to a conductor on said printed circuit board after said printed circuit board is mounted on said shoulder.

* * * * *